US008760039B2

(12) United States Patent
Schiller et al.

(10) Patent No.: US 8,760,039 B2
(45) Date of Patent: Jun. 24, 2014

(54) COMPACT ACTIVE VIBRATION CONTROL SYSTEM FOR A FLEXIBLE PANEL

(75) Inventors: Noah H. Schiller, Yorktown, VA (US); Randolph H. Cabell, Hampton, VA (US); Daniel F. Perey, Yorktown, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 491 days.

(21) Appl. No.: 13/291,372

(22) Filed: Nov. 8, 2011

(65) Prior Publication Data
US 2013/0113338 A1    May 9, 2013

(51) Int. Cl.
*H01L 41/04*    (2006.01)
*H03H 9/25*    (2006.01)
*G01L 1/00*    (2006.01)
*G01M 5/00*    (2006.01)

(52) U.S. Cl.
USPC .......... 310/338; 310/313 B; 310/367; 73/767; 73/774; 73/778; 73/802

(58) Field of Classification Search
USPC ........ 310/313 B, 318, 338, 367; 73/767, 774, 73/778, 802
See application file for complete search history.

(56) References Cited

U.S. PATENT DOCUMENTS

| 4,565,940 | A | 1/1986 | Hubbard, Jr. |
| 4,849,668 | A | 7/1989 | Crawley et al. |
| 5,054,323 | A | 10/1991 | Hubbard, Jr. et al. |
| 6,341,528 | B1 * | 1/2002 | Hoffman et al. ............ 73/777 |
| 6,707,232 | B2 * | 3/2004 | Iino et al. ............ 310/323.02 |
| 7,893,602 | B1 | 2/2011 | Schiller et al. |
| 2010/0194243 | A1 * | 8/2010 | Yoneyama ............ 310/338 |

OTHER PUBLICATIONS

Noah H. Schiller, et al., "Active Damping Using Distributed Anisotropic Actuators," ASME International Mechanical Engineering Congress & Exposition, Nov. 12-18, 2010, pp. 1-8, Vancouver, British Columbia, Canada.
Paolo Gardonio, et al., "Smart Panels with Velocity Feedback Control Systems Using Triangularly Shaped Strain Actuators," J. Acoustical Society of America, Apr. 2005. pp. 2046-2064, vol. 117(4), Pt, 1.
Micromega Website, http://www.micromega-dynamics.com/amd.htm, May 27, 2005, pp. 1-3.
Moog Websito, http://www.moog.com/products/vibration-suppression-control/, 2010, pp. 1-2.

(Continued)

*Primary Examiner* — Thomas Dougherty
(74) *Attorney, Agent, or Firm* — Andrea Z. Warmbier

(57) ABSTRACT

A diamond-shaped actuator for a flexible panel has an interdigitated electrode (IDE) and a piezoelectric wafer portion positioned therebetween. The IDE and/or the wafer portion are diamond-shaped. Point sensors are positioned with respect to the actuator and measure vibration. The actuator generates and transmits a cancelling force to the panel in response to an output signal from a controller, which is calculated using a signal describing the vibration. A method for controlling vibration in a flexible panel includes connecting a diamond-shaped actuator to the flexible panel, and then connecting a point sensor to each actuator. Vibration is measured via the point sensor. The controller calculates a proportional output voltage signal from the measured vibration, and transmits the output signal to the actuator to substantially cancel the vibration in proximity to each actuator.

19 Claims, 3 Drawing Sheets

(56) References Cited

OTHER PUBLICATIONS

Randolph Cabell, "Modeling and Mitigation of Interior Noise and Vibration in Civilian Rotorcraft," Technical Conference. Mar. 15-17, 2011, pp. 1-23, Cleveland. Ohio.

Noah Schiller, et al., "Active Damping Using Distributed Anisotropic Actuators," ASME 2010 International Mechanical Engineering Congress & Exposition. Nov. 12-18, 2010, pp. 1-18, Vancouver, British Columbia, Canada.

* cited by examiner

COMPACT ACTIVE VIBRATION CONTROL SYSTEM FOR A FLEXIBLE PANEL

STATEMENT REGARDING FEDERALLY SPONSORED RESEARCH OR DEVELOPMENT

The invention described herein was made by employees of the United States Government and may be manufactured and used by or for the Government of the United States of America for governmental purposes without the payment of any royalties thereon or therefor.

TECHNICAL FIELD

The present disclosure relates to a system and a method for actively controlling the vibration of a flexible panel.

BACKGROUND OF THE INVENTION

The structural vibration of a flexible panel or another flexible component can generate undesirable noise, particularly within an enclosure constructed using such panels. For instance, aluminum panels of an aircraft fuselage can vibrate when the aircraft is in flight, which in turn can generate substantial noise within the aircraft. Mitigation of such acoustical/structural resonance may include the use of passive or active damping techniques. As an example, a compliant damping mechanism may be used to dissipate vibration energy as heat. Other approaches may include the use of sound absorbing materials. Active damping techniques, by way of contrast, involve the active, targeted use of force actuators to produce an actuation force that at least partially counteracts a resonant vibration within a particular range of frequencies. However, conventional approaches to active damping may be less than optimal when used with flexible panels.

SUMMARY OF THE INVENTION

An active vibration control system is disclosed herein that is suitable for reducing the vibratory response of a flexible panel. Non-limiting example panels which may be prone to resonant vibration include an aircraft fuselage bay, a vehicle body panel, and a motor/engine enclosure. The present active vibration control system uses one or more piezoelectric diamond-shaped actuators. Each diamond-shaped actuator includes an inter-digitated electrode (IDE). The IDE is connected to a piezoelectric wafer portion. The diamond-shaped actuators may be adhered or otherwise surface-mounted to the flexible panel. The control system also includes one or more point sensors, e.g., miniature accelerometers, and a controller. The controller is in electrical communication with the point sensor(s) and the actuator(s), and performs the requisite calculations and signal processing steps required for substantially cancelling the vibration of the panel.

The various point sensors are positioned with respect to a given actuator, e.g., at each apex thereof or in/toward the center of the actuator depending on the embodiment. Multiple point sensors may be used with each actuator to provide the desired response. Likewise, a designated controller may be used with each of the actuators to provide a desired level of control redundancy.

The controller, which may be embodied as a small printed circuit board assembly that is surface mounted to the flexible panel, processes a vibration signal from each point sensor. The controller then generates a proportional output voltage signal, which in turn is transmitted to the actuator. The proportional output voltage signal generates an out-of-phase vibration-canceling response via the actuator to the measured vibration at the surface of the flexible panel.

The piezoelectric wafer portion and/or the IDE are substantially diamond-shaped. The IDE applies a predetermined electrical field, for instance in an in-plane direction. Unlike prior art actuators, the diamond-shaped actuators disclosed herein need not be aligned along a fixed edge or boundary edge of the flexible panel to which the actuator is connected, although in some embodiments an apex or edge of the actuator may aligned with the boundary. When aligned in this manner, fewer point sensors may be used with the actuator.

The above features and advantages and other features and advantages of the present invention are readily apparent from the following detailed description of the best modes for carrying out the invention when taken in connection with the accompanying drawings.

DETAILED DESCRIPTION OF THE INVENTION

Figure 1:
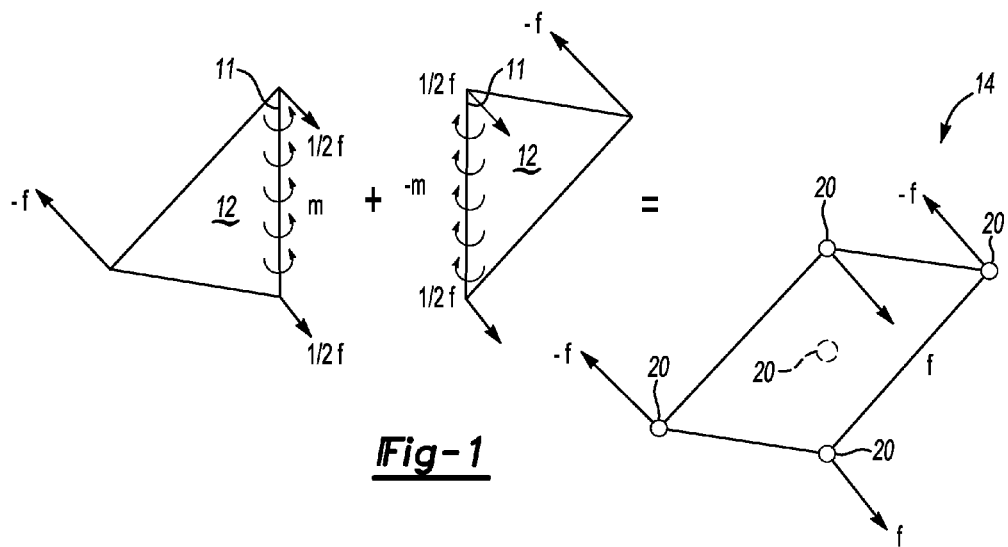
FIG. 1 is a schematic illustration of an example diamond-shaped piezoelectric actuator having multiple point sensors, along with various point forces generated by the actuators.

Referring to the drawings, wherein like reference numbers represent like components throughout the several figures, a diamond-shaped actuator 14 as detailed below is shown schematically in FIG. 1. Also shown is a pair of example anisotropic triangular actuators 12. Various point forces (f) are represented with respect to the four apexes of the diamond-shaped actuator 14. Moments (±m) about a base edge 11 of the example triangular anisotropic actuators 12 are also represented.

Previous work using the triangular actuators 12 of FIG. 1 is disclosed in U.S. Pat. No. 7,893,602 to Schiller et al., which is hereby incorporated by reference in its entirety. It is shown in the above listed reference that, if the boundaries of a flexible panel are clamped, for instance a panel that is perimeter-supported or rib-stiffened, then the point forces (f) and line moments (m) along the base edge 11 of each triangular actuator 12 will not couple to the structural response of the panel that is being damped. Therefore, a single point sensor placed at a vertex opposite the base edge 11 can yield a substantially collocated frequency response. That is, the phase of the response will be bounded between ±90 degrees.

However, if the flexible panel to be damped is not clamped, i.e., if a rib-stiffened or boundary-stiffened panel is not used, or more precisely, and if the triangular actuators 12 shown in FIG. 1 are placed away from the boundary or perimeter of the panel, then the moment about the base edge 11 couples to the structural response out-of-phase with the point force (f) at higher frequencies, with the signs + and − representing relative direction. When implemented as part of an active vibration control system, the moments (m) of the base edges 11 of the various triangular actuators 12 may combine to destabilize the system. The present design is intended to mitigate that effect, while also allowing greater flexibility in the positioning of the diamond-shaped actuator 14 with respect to the panel to which the diamond-shaped actuator 14 is attached.

It is recognized herein that a pair of the triangular actuators 12 can be effectively combined as shown to form the diamond-shaped actuator 14 of the present disclosure. Such an approach eliminates the potentially destabilizing base moments along the base edges 11 of the triangular actuators 12. A collocated transducer pair can be obtained using commonly available point sensors 20, for instance miniature accelerometers, along with the diamond-shaped actuator 14. A point sensor 20 is also shown in phantom in FIG. 1 to represent an optional position, as explained below with reference to FIG. 2 and the point sensor 20A shown therein.

The point forces (½ f) of the triangular actuators 12 combine to form point forces (f) at vertices of the presently disclosed diamond-shaped actuator 14. Thus, a practical and compact active vibration control system can be created with an operational bandwidth of approximately 20 Hz through approximately 5 kHz. As is understood in the art, at frequencies above approximately 5 kHz, passive noise control treatments may provide a relatively efficient and potentially more cost effective solution.

The diamond-shaped actuator 14 shown schematically in FIG. 1 is constructed at least partially of a suitable piezoelectric material. As will be understood by those of ordinary skill in the art, piezoelectric materials are crystalline structures or ceramics which produce a proportional output voltage when a mechanical force or stress is applied thereto. Quartz, tourmaline, lead zirconate titanate, and barium titanate are a few non-limiting examples. Piezoelectric materials produce a proportional voltage in response to an applied mechanical force or pressure. Such materials can also change their shape and/or dimensions in response to an applied electric field, thereby making piezoelectric materials potentially useful as actuators in a host of different applications.

Since this effect also applies in the reverse manner, an input voltage applied to a sample piezoelectric material such as the diamond-shaped actuators 14 will produce a proportional mechanical force or stress. This force can be imparted to a panel to which the diamond-shaped actuators 14 are mounted. The activation of a typical piezoelectric material can result in a change in dimension of approximately 0.1% for piezoceramics and 1% for piezo-polymers. Suitably designed transducer structures made from these particular materials can therefore be made that bend, expand, or contract as desired when a voltage is applied thereto.

Figure 2:
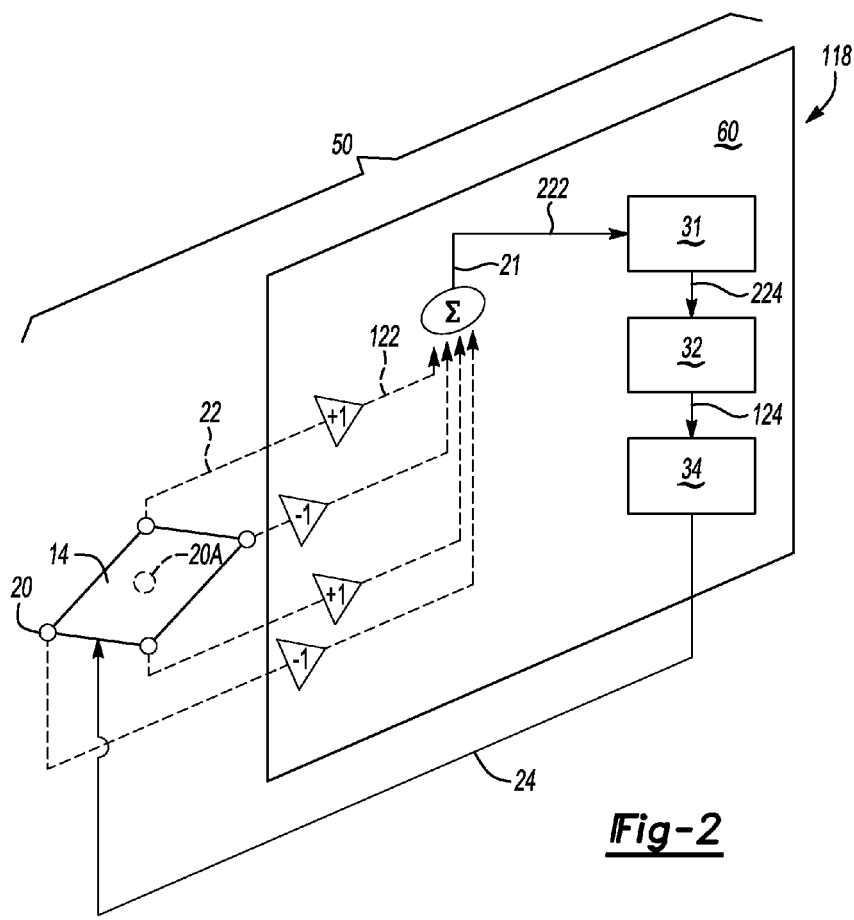
FIG. 2 is a schematic circuit diagram of an example vibration control system having a diamond-shaped actuator and controller.

Referring to FIG. 2, an active vibration control system 50 includes at least one diamond-shaped actuator 14. The diamond-shaped actuator 14 is in electrical communication with a controller 118. Additional diamond-shaped actuators 14 may be connected to a flexible panel 16 (see FIG. 3) and placed in communication with the same controller 118 in this particular embodiment. The diamond-shaped actuator 14 may be relatively thin, e.g., approximately 0.3 mm to approximately 0.4 mm thick in one embodiment or less than approximately 0.5 mm in another example embodiment. As such, the diamond-shaped actuator 14 may be integrated partially or fully within a composite structure.

Each diamond-shaped actuator 14 may include one or more point sensors 20. As noted above, the point sensors 20 may be embodied as miniature accelerometers configured to measure a linear acceleration of a portion of a flexible panel to which the point sensor 20 is attached. When positioned away from the boundary or outer perimeter of a given flexible panel, four point sensors 20 may be used to achieve a collocated transducer pair. However, if the vibration control system 50 of FIG. 2 is mounted along the rigid boundary of such a panel, a point sensor 20 need not be used at the boundary. Additionally, if the vibration control system 50 is designed to target a narrow frequency band, then a single point sensor 20A may be used, as shown in phantom, e.g., in or toward the middle of the diamond-shaped actuator 14 instead of at one of the vertexes.

The weighted sum of the point sensors 20 yields an equivalent sensor matched with the diamond-shaped actuator 14, regardless of the boundary conditions of the flexible panel being damped. In other words, unlike the example triangular anisotropic actuators 12 shown in FIG. 1, which are limited to boundary positioning on a rib-stiffened panel, the present diamond-shaped actuator 14 can be positioned anywhere on the surface of the panel, including away from the rigid boundary or perimeter of the panel.

The controller 118 of FIG. 2 provides the necessary power electronics for signal conditioning, filtering, and amplification of the measured vibration signals (arrows 22) received from the various point sensors 20. All of the requisite control structure, including any required processors, diodes, transistors, busses, etc., may be embodied as a printed circuit board assembly (PCBA) 60, for instance by using a mix of surface mount technologies and through-hole components to sufficiently miniaturize the controller 118.

Figure 3:
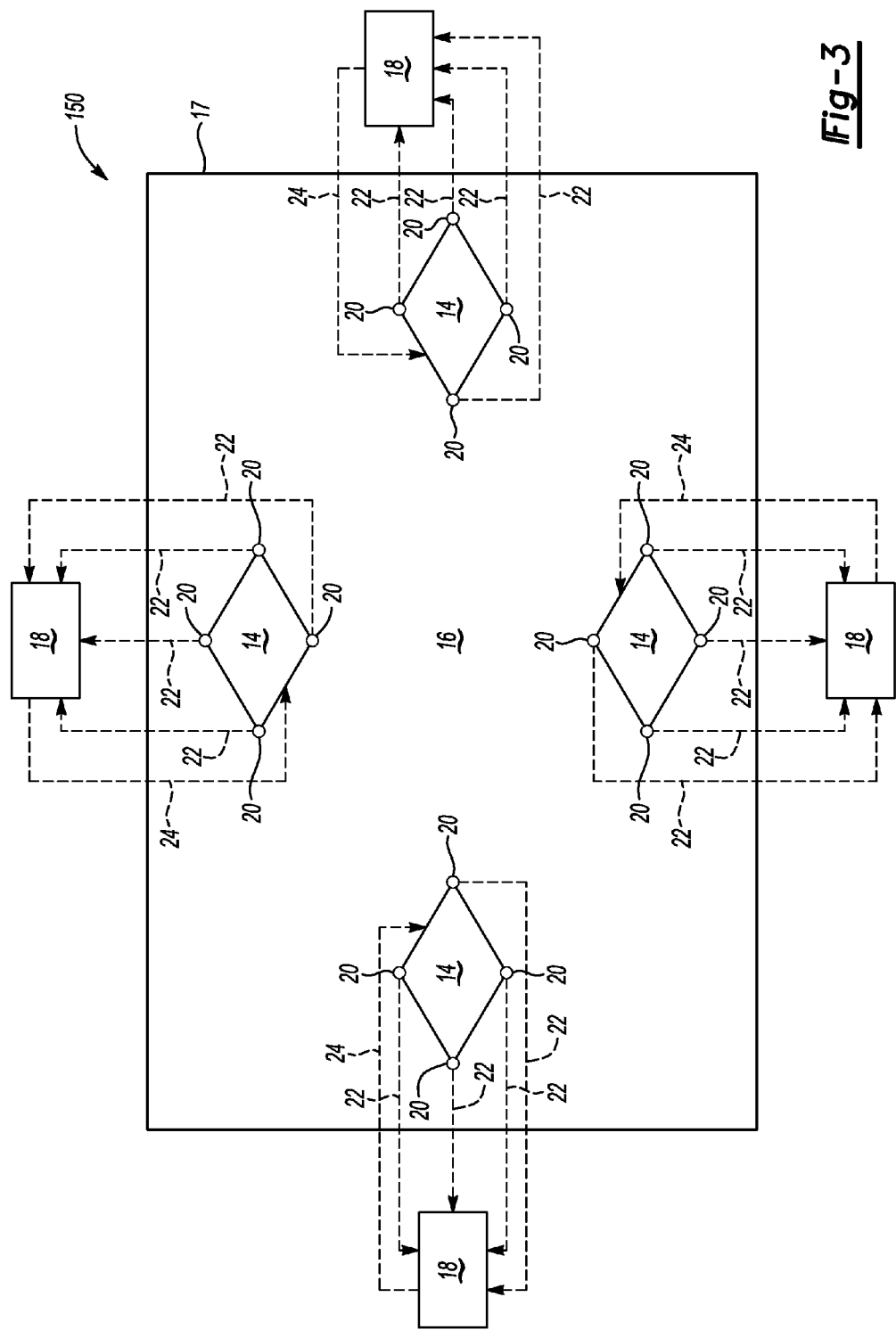
FIG. 3 is a schematic circuit diagram of an example flexible panel with multiple independent vibration control systems.

The example diamond-shaped actuator 14 of FIG. 2 applies a force to a flexible panel, for instance the flexible panel 16 shown in FIG. 3, in response to a proportional output voltage signal (arrow 24) from the controller 118. As used herein, the term "proportional voltage" describes a scaled negative voltage producing motion in a flexible panel that effectively cancels or at least partially offsets/dampens the vibration that is measured, detected, or otherwise determined by a given point sensor 20.

The controller 118 of FIG. 2, as well as the controller 18 shown in FIG. 3 and described below, may be configured as a closed-loop proportional control device. As such, the controller 118 has the necessary operational amplifiers, transistors, resistors, capacitors, diodes, and/or other necessary electronic circuit components required for manipulating one or more control variables. The controller 118 processes the raw acceleration data transmitted from a corresponding point sensor 20, and then determines a linear acceleration value of a portion of a flexible panel in close proximity to that point sensor 20. The controller 118 also calculates a linear velocity value using the linear acceleration value. From this intermediate value, the controller 118 can then generate a scalar negative or proportional voltage signal as the proportional output voltage signal (arrow 24) which can be modified via a calibrated applied gain. i.e., a constant of proportionality, as needed to thereby affect the desired vibrational attenuation.

The controller 118 may be specifically designed for use with point sensors 20 configured as standard Integrated Electronics Piezo Electric (IEPE) accelerometers. Although not shown for illustrative simplicity, the PCBA 60 receives power from a main power bus, for instance a typical 28-volt DC bus used aboard a typical aircraft, and provides reduced power to each of the point sensors 20. Subsequent stages amplify and combine the response from all of the point sensors 20.

Each point sensor 20 generates a measured vibration signal (arrow 22) which can be normalized (+1, −1) by the controller 118 in a like manner for oppositely-positioned point sensors 20. The normalized vibration signals (arrows 122) are then fed into a summation node 21 to generate a single normalized vibration signal (arrow 222). The normalized vibration signals (arrow 222) from multiple diamond-shaped actuators 14 (not shown) may be integrated by an integration module 31 of a PCBA 60 to generate a proportional signal (arrow 224) that is proportional to velocity. Similar summation nodes can provide the same function for other diamond-shaped actuators 14 used in conjunction with the same flexible panel.

A low-pass filter 32 may be used to process the proportional signal (arrow 224) into a filtered signal (arrow 124). For instance, a cutoff of approximately 11 kHz may be used to limit the impact of any higher frequency mismatches between the proportional signal (arrow 224) and the diamond-shaped actuator 14, e.g., caused by actuator shaping errors, misplacement of point sensors 20, or high-frequency sensor dynamics. An amplifier 34 may be used to boost the filtered signal (arrow 124) to form the proportional output voltage signal (arrow 24), which is then transmitted to the diamond-shaped actuator 14 as noted above. Energy is dissipated in the control system 50 in the form of heat within the controller 118.

Referring to FIG. 3, a vibration control system 150 is shown in another example embodiment. Here, each diamond-shaped actuator 14 has its own dedicated controller 18, thus providing a measure of control redundancy. Each diamond-shaped actuator 14 may be adhered or bonded to the surface of a flexible panel 16 having an outer perimeter or boundary 17 using adhesive or other suitable means. The flexible panel 16 may be configured as a bay of an aircraft fuselage in a non-limiting example embodiment, and thus constructed of a sufficiently light weight material such as 6061-T6 aluminum. Other embodiments may include a Plexiglas or other flexible window pane, an aircraft, road, or water vehicle body panel, or any other substantially flexible structure which may vibrate at times during operation. Those of ordinary skill in the art will appreciate the noise-reducing potential of the control system 150, as well as other uses such as stabilizing of optical devices or other sensitive instrumentation.

In the simplified example of FIG. 3, four diamond-shaped actuators 14 may be positioned around the flexible panel 16 as shown, with each diamond-shaped actuator 14 having a point sensor 20 positioned at each of its four apexes. Localized control is provided over each actuator 14 by a corresponding controller 18. This particular embodiment, although involving a larger number of controllers 18 per flexible panel 16 than the embodiment of FIG. 2 described above, may provide added control redundancy. That is, if a given controller 18 should happen to fail, the remaining controllers 18 of the same panel 16 can continue to function properly.

Figure 4:
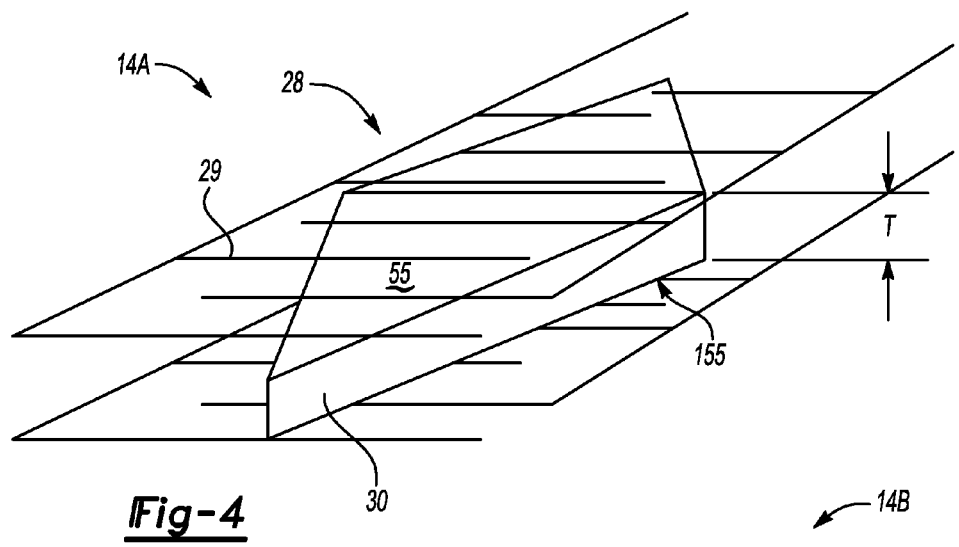
FIG. 4 is a schematic perspective view of an example diamond-shaped actuator.
Figure 5:
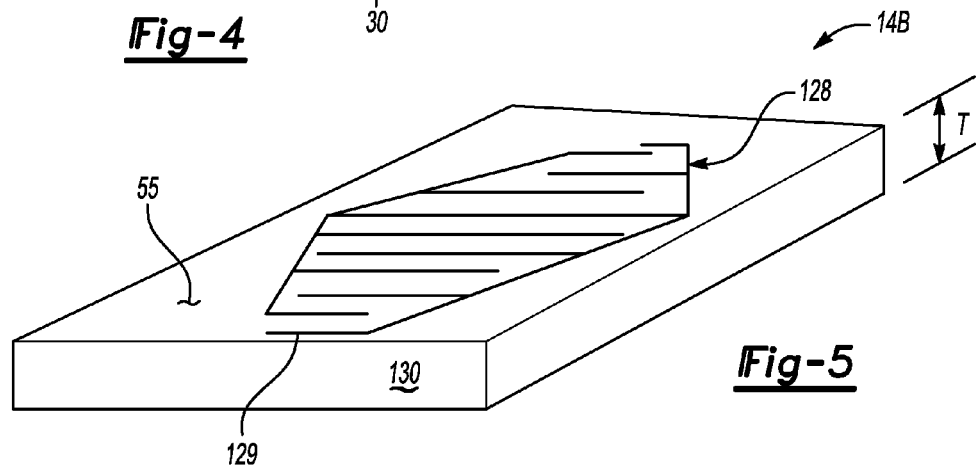
FIG. 5 is a schematic perspective view illustration of another example diamond-shaped actuator.

Referring to FIGS. 4 and 5, in two possible embodiments the requisite shape of the diamond-shaped actuators 14 described above with reference to FIGS. 1-3 may be provided by using a diamond-shaped actuator 14A (FIG. 4) or a diamond-shaped actuator 14B (FIG. 5). The diamond-shaped actuator 14A of FIG. 4 has a diamond-shaped piezoelectric wafer 30 with a thickness (T). The diamond-shaped actuator 14B of FIG. 5 has a rectangular piezoelectric wafer 130 with thickness (T). As noted above, the diamond-shaped actuator 14 may be relatively thin, and therefore the dimension (T) may be in the range of approximately 0.3 mm to approximately 0.5 mm in an example embodiment. The diamond-shaped actuator 14 may be integrated partially or fully within a composite structure.

In FIG. 4, an IDE 28 with a plurality of electrode members 29 is mounted to the primary surface 55 of the diamond-shaped piezoelectric wafer 30. The reverse primary surface 155 may have mounted thereto another IDE 28. Likewise, in FIG. 5 a generally diamond-shaped IDE 128 with a plurality of electrode members 129 is mounted to the primary surface 55 of the rectangular piezoelectric wafer 130. Unlike a conventional monolithic-shaped transducer in which the electrical field couples to both in-plane directions equally, the IDE pattern of FIGS. 4 and 5 enables the application of an electrical field in a preferred in-plane direction.

Figure 6:
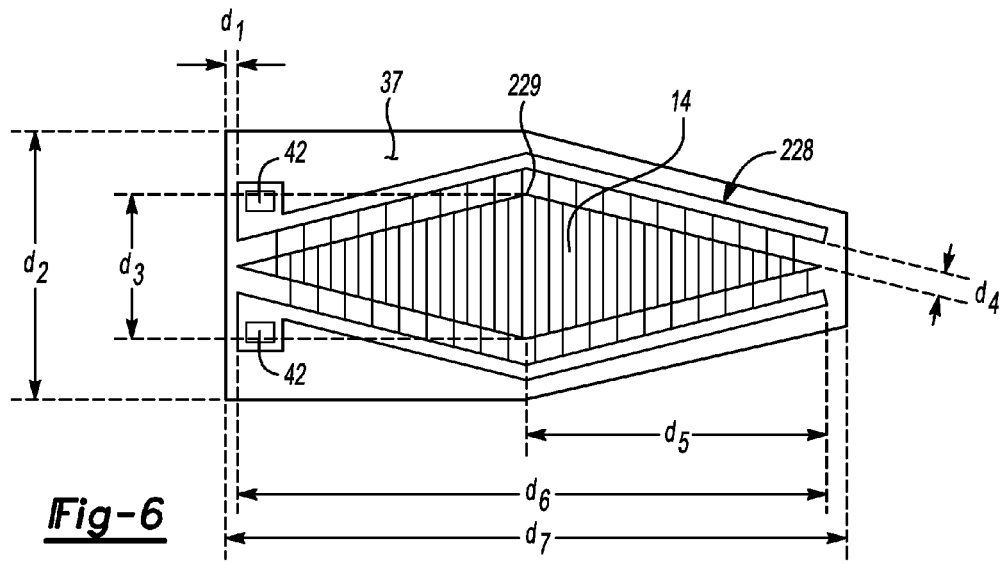
FIG. 6 is a schematic plan view illustration of a diamond-shaped actuator usable with the vibration control systems of FIGS. 2 and 3.

Referring to FIG. 6, a diamond-shaped actuator 14 is shown in another possible embodiment. The diamond-shaped actuator 14 is affixed to a membrane 37. IDEs 228 with electrode members 229 are connected to a power source (not shown) via solder pads 42. Various dimensions $d_1$-$d_7$ are included to detail possible scale according to a particular embodiment. Other dimensions may be contemplated without departing from the intended inventive scope.

In an example embodiment, $d_1$=approximately 1-2 mm, $d_2$=approximately 28-30 mm, $d_3$=approximately 16-18 mm, $d_4$=approximately 2-3 mm, $d_5$=approximately 31 to 33 mm, $d_6$=approximately 64 to 65 mm, and $d_7$=approximately 69 to 71 mm. One of ordinary skill in the art will appreciate that the actuator 14 can be scaled to the specific application, and thus the above example ranges are not limiting.

While the best modes for carrying out the invention have been described in detail, those familiar with the art to which this invention relates will recognize various alternative designs and embodiments for practicing the invention within the scope of the appended claims.

The invention claimed is:

1. A system for reducing vibration in a flexible panel, the system comprising:
   a diamond-shaped actuator having a piezoelectric wafer portion and an inter-digitated electrode (IDE) positioned with respect to the piezoelectric wafer, wherein the diamond-shaped actuator is configured to generate and transmit a force to the flexible panel in response to a proportional output voltage signal;
   a point sensor positioned with respect to the diamond-shaped actuator, wherein the point sensor is configured for measuring the vibration at a surface of the flexible panel; and
   a controller that is electrically connected to the actuator and to the point sensor, wherein the controller receives a vibration signal from the point sensor describing the measured vibration, and is configured for:
   calculating the proportional output voltage signal using the vibration signal; and
   transmitting the proportional output voltage signal to the actuator to substantially cancel the vibration at the surface of the flexible panel.

2. The system of claim 1, including a pair of the IDEs, wherein the piezoelectric wafer is positioned between the pair of IDEs.

3. The system of claim 1, wherein the piezoelectric wafer is substantially diamond-shaped.

4. The system of claim 1, wherein the IDE is substantially diamond-shaped.

5. The system of claim 1, wherein the point sensor is positioned at an apex of the diamond-shaped actuator.

6. The system of claim 1, including four of the point sensors, wherein each point sensor is positioned at a different apex of the diamond-shaped actuator.

7. The system of claim 1, wherein the point sensor is positioned on an interior of the actuator away from any of the vertices of the actuator, and wherein the actuator is positioned away from a boundary or perimeter of the flexible panel.

8. The system of claim 1, wherein the point sensor is an accelerometer configured for measuring a linear acceleration of a portion of the flexible panel as the quantity of the vibration.

9. The system of claim 1, including a plurality of the actuators and a matching plurality of the controllers, wherein each controller is electrically connected to a corresponding one of the actuators.

10. The system of claim 1, wherein the actuator is approximately 0.3 mm to approximately 0.4 mm thick.

11. The system of claim 1, wherein the frequency of the vibration is less than approximately 5 kHz.

12. An actuator for reducing vibration of a flexible panel, the actuator comprising:
    a piezoelectric wafer; and
    an inter-digitated electrode (IDE) connected to a surface of the piezoelectric wafer; wherein:
        at least one of the piezoelectric wafer and the IDE is substantially diamond-shaped; and
        the actuator is in communication with a controller, and is configured to produce a force signal that is out-of-phase with respect to the vibration in response to receiving a proportional output voltage signal transmitted by a controller.

13. The actuator of claim 12, including a pair of the IDEs, wherein the piezoelectric wafer is positioned between the pair of the IDEs such that each of the pair of IDES is connected to a different surface of the piezoelectric wafer.

14. The actuator of claim 12, wherein the frequency of the vibration is approximately 20 Hz to approximately 5 kHz.

15. The actuator of claim 12, wherein the actuator is less than approximately 0.5 mm thick.

16. A method for controlling vibration in a flexible panel, the method comprising:
    connecting a diamond-shaped actuator to a surface of the flexible panel, wherein the diamond-shaped actuator includes a piezoelectric wafer connected to an inter-digitated electrode (IDE);
    connecting a point sensor to the diamond-shaped actuator;
    measuring a vibration at a surface of the flexible panel using the point sensor;
    calculating, via a controller, a proportional output voltage signal from the measured vibration; and
    transmitting the proportional output voltage signal to the diamond-shaped actuator to thereby generate a corresponding output force in proximity to the actuator, wherein the corresponding output force is sufficient for substantially cancelling the vibration in proximity to each actuator.

17. The method of claim 16, wherein the point sensor is a miniature accelerometer, and wherein measuring the vibration includes measuring a linear acceleration value of a surface portion of the flexible panel using the miniature accelerometer.

18. The method of claim 17, wherein calculating the proportional output voltage signal includes calculating a linear velocity value from the linear acceleration value and then applying a predetermined proportional gain to the linear velocity value.

19. The method of claim 16, wherein the flexible panel is configured for use as a bay of an aircraft fuselage, and wherein connecting an actuator to the flexible panel includes adhering the actuator to a surface of the bay.

* * * * *